United States Patent [19]

Abe

[11] Patent Number: 4,774,983

[45] Date of Patent: Oct. 4, 1988

[54] SAFETY DEVICE FOR GAS WELDING

[76] Inventor: Tsutomu Abe, 8-48, Mitsuzawahigashi-cho, Kanagawa-ku, Yokohama-shi, Kanagawa-ken, Japan

[21] Appl. No.: 934,153

[22] Filed: Nov. 24, 1986

[30] Foreign Application Priority Data

Nov. 27, 1985 [JP] Japan .................. 60-265027

[51] Int. Cl.⁴ ........................................... F16L 37/28
[52] U.S. Cl. ......................... 137/614.20; 137/614.06; 137/614.17; 251/149.6; 285/306
[58] Field of Search .............. 137/614, 614.06, 614.16, 137/614.17, 614.18, 614.19, 614.2, 5; 285/83, 306; 251/149, 149.6; 48/192

[56] References Cited

U.S. PATENT DOCUMENTS

| | | | |
|---|---|---|---|
| 2,279,146 | 4/1942 | Schneller | 285/169 |
| 2,327,611 | 8/1943 | Scheiwer | 285/169 |
| 2,463,253 | 3/1949 | Earle et al. | 285/169 |
| 2,482,457 | 9/1949 | Boedecker | 48/192 |
| 2,648,548 | 8/1953 | Scheiwer | 284/18 |
| 2,831,500 | 4/1958 | Fenuena et al. | 137/614.2 X |
| 3,474,827 | 10/1969 | Torres | 137/614.06 |
| 3,689,239 | 9/1972 | Eriksson | 48/192 |
| 4,088,436 | 5/1978 | Alferes | 48/192 X |

Primary Examiner—A. Michael Chambers
Assistant Examiner—John C. Fox
Attorney, Agent, or Firm—Bruce L. Adams; Van C. Wilks

[57] ABSTRACT

A safety device for gas welding is provided between a gas supply source and a burner torch to prevent counter-flow and back-fire from the burner torch in the direction of the gas supply source, and further, to positively cut off the flow path, so that explosion of the gas supply source is prevented. The gas welding safety device comprises a socket-side coupling providing a flow path, a plug-side coupling separably connected with the socket-side coupling and having a flow path communicating with the flow path of the socket-side coupling, and a mechanical mechanism for separably connecting both couplings. Within the flow path of the socket-side coupling, a movable valve seat confining a movable valve body for cutting off the normal gas flow are incorporated. The valve body has a valve seat portion and in turn houses a check valve for preventing dangerous counter-flow. If counter-flow pressure is generated, the check valve actuates and prevents the counter-flow and the counter-flow pressure also actuates the movable valve seat, which in turn actuates the mechanical mechanism, automatically physically separating both couplings.

14 Claims, 3 Drawing Sheets

SAFETY DEVICE FOR GAS WELDING

BACKGROUND OF THE INVENTION

1. Field of the Invention

This invention relates to a safety device for gas welding, and more particularly to a safety device for gas welding which is provided between a gas supply-side and a burner torch to prevent the explosion of the gas supply-side due to counter-flow and back-fire of the gas.

2. Description of the Prior Art

Usually, in gas welding, when oxygen gas itself or a mixture of oxygen gas and inflammable gas flows backward from the burner torch-side to the direction of the inflammable gas supply source of acetylene gas and the like, under the burning state or the nonburning state, then the supply source of inflammable gas will explode. Therefore, certain methods for preventing the explosion of the inflammable gas supply source by providing a safety device between the burner torch and the inflammable gas supply source are known.

One known safety device is in the form of a pipe joint connecting the flow path of a hose or a pipe and the like, and devices by which the counter-flow and the back-fire of gas are prevented by means of a check valve are used. In these safety devices, however, the counter-flow and the back-fire of gas are prevented when they take place, but the connections of the hose and the like with the safety device is held and never released, so that there remains a danger or explosion.

SUMMARY OF THE INVENTION

An object of this invention is to provide a safety device for gas welding wherein when the counter-flow or the back-fire of gas is generated from the burner torch-side to the gas supply-side, the counter-flow or the back-fire is prevented, and the connection by means of the safety device of a hose or a tube is automatically released so as to separate their connection to each other. Thus, the explosion can be completely prevented.

To attain the above objects, the safety device for gas welding according to this invention comprises a socket-side coupling having a flow path, a plug-side coupling communicating with the flow path of the socket-side coupling, means for separably connecting the couplings, and by means of these couplings, the hose or the pipe of the gas supply source-side and the hose of the burner torch-side are separably connected. In the socket-side coupling, there are incorporated a movable valve seat and a valve body to allow the normal flow under the connected condition with the plug-side coupling within a flow path therein, and a check valve body for preventing the counter-flow together with a check valve seat provided on the valve body. When the check valve is closed by the counter-flow pressure, the movable valve seat is made to move via the valve body, and the connection of the connecting means is released by the movable valve seat. As a result, both couplings are automatically separated.

These and other objects as well as other features of this invention will become apparent to those skilled in the art from the following description with reference to the accompanying drawings.

DETAILED DESCRIPTION OF THE INVENTION

Figure 1:
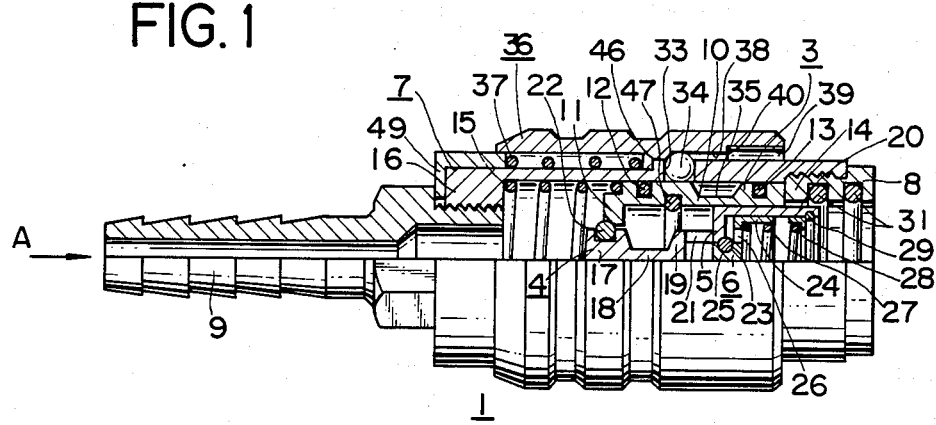
FIG. 1 is a partial longitudinal side view of the socket-side coupling.

A safety device for gas welding according to this invention comprises a socket-side coupling 1, a plug-side coupling 2, a means for connecting both couplings, a first valve means including a movable valve seat 3 and a valve body 4 which opens and closes flow paths mutually communicating between both couplings, and a second valve means including a valve seat portion 5 and a check valve body 6 for preventing counter-flow by contact with the valve seat portion 5.

The socket-side coupling further comprises a socket body 7 forming a flow path. A guide sleeve 8 for the plug is connected by threads to one end of the socket body 7, and a hose inserting portion 9 is connected by threads to another end thereof, and thus the movable valve seat 3, the valve body 4 and the check valve body 6 are incorporated within the socket body 7.

The movable valve seat 3 has a cylindrical portion 10 and a flange-shaped seat portion 11, and is movable relative to the socket body 7 in both directions (in the drawings, forward position in the right direction and backward position in the left direction), under the state that the cylindrical portion 10 contacts airtightly with an inner peripheral face of the socket body 7 by means of packings 12, 13. The guide sleeve 8 engages, at its shoulder portion 14, with the end portion of the cylindrical portion 10 of the valve seat 3, to prevent the valve seat 3 from coming out of the guide sleeve 8 to the plug. A compression coil spring 15 is provided between the valve seat 3 and the shoulder portion 16 of the socket body 7 to urge the valve seat 3 to move in the direction of the guide sleeve 8. The valve seat 3 is therefore pressed to the forward position engaging with the guide sleeve 8 under the separated state of both couplings 1, 2.

The valve body 4 comprises a head portion 17 having somewhat smaller outside diameter than inside diameter of the seat portion 11 of the valve seat 3, a slender neck portion 18 extending from the head portion, a cylindrical portion 19 extending from the neck portion 18 and having the same diameter as the head portion 17, and a cylindrical portion 20 extending from the cylindrical portion 19 and having such a size as to slidingly contact with the inner peripheral face of the cylindrical portion 10 of the valve seat 3. The valve body 4 is incorporated within the valve seat 3 so that cylindrical portion 20 of the valve body will contact with the inner peripheral face of the cylindrical portion 10 of the valve seat 3 and slide thereon, and thus divide the socket body 7 into two parts. The fluid flowing in the normal direction (of the arrow mark (A) will pass through a hole 21 of the cylindrical portion of the valve body 4 from outside to inside, and flow out in the direction of the plug 2. On the head portion 17 of the valve body 4 is fixed a packing 22 which contacts with the seat portion 11 of the valve seat 3 to close the flow path.

The check valve body 6 is provided with a head portion 23 having a smaller outside diameter than the inside diameter of the cylindrical portion 19 of the valve body 4, a cylindrical portion 24 which has a large diameter extending from the head portion and which contacts with the inner peripheral face of the cylindrical portion 20 of the valve body 4. On the head portion 23, there is provided a packing 25 contacting with the valve seat portion 5 of the valve body 4. This check valve 6 is incorporated within the cylindrical portion 20 of the valve body 4, and the outer peripheral face of the cylindrical portion 24 is slidably contacting with the inner peripheral face of the cylindrical portion 20. In the case of flow of fluid in the normal direction, the check valve body 6 is pressed in to the right or forward direction (the normal flow direction) to open the valve, and fluid in the normal direction passes through a hole 26 of the check valve body 6 from outside to inside, and flows out in the direction of the plug 2. In case of counter-flow, the check valve body 6 is moved leftward (counter-flow direction) and the packing 25 will contact with the valve seat portion 5 of the valve body 4 to prevent the counter-flow. If a compression coil spring 27, as shown having weaker resilience than the fluid pressure in the normal direction, is provided between the check valve body 6 and a spring bearing 28, the check valve body 6 will work more sharply than without the spring 27 when counter-flow occurs. The spring bearing 28 is held in place by a ring 29 within the cylindrical portion 20 of the valve body 4.

The plug-side coupling 2 (see FIG. 2) is provided with a cylindrical plug body 30 having a flow path communicating with the flow path of the socket-side coupling 1; the front end thereof is air-tightly inserted via a packing 31 into the guide sleeve 8 of the socket body 7; and the rear end thereof is connected with a cylindrical hose inserting portion 32.

As a means of mutual connection between the socket-side coupling 1 and the plug-side coupling 2, the socket-side coupling 1 comprises a plurality of circular holes 33, connecting balls 34 inserted in the holes, an annular groove 35 formed on the movable valve seat 3 so as to engage with the connecting balls within the socket body 7, a movable sleeve 36 reciprocatably and loosely mounted on the outer periphery of the socket body to prevent the connecting balls from escaping out of the socket body 7. The movable sleeve 36 is urged by a compression coil spring 37 so as to advance always in the right direction as viewed in the drawings, and comprises an inner peripheral face 38 contacting with the connecting balls 34 at the forward position thereof, an inner peripheral face 39 having larger diameter than the inner peripheral face 38 and forming an annular space between an outer peripheral face of the socket body 7, and a shoulder portion 40 formed between these two inner peripheral faces. The spring 37 is inserted within an annular space between the movable sleeve 36 and the socket body 7, and the ends thereof are engaged with a flange 46 of the movable sleeve 36 and a cylindrical spring bearing 49.

The plug-side coupling 2 comprises a movable sleeve 41 reciprocatably and loosely mounted on the outer periphery of the plug body 30, and the sleeve is urged by a compression spring 42 so as to advance always in the left direction as viewed in the drawings, and has an open edge 43 for insertion in an annular space between sleeve 36 and the socket body 7, and an annular connecting groove 44 engaging with the connecting balls 34. A cylinder 45 is incorporated between the movable sleeve 41 and the plug body 30, and is urged backward by the spring 42.

Figure 2:
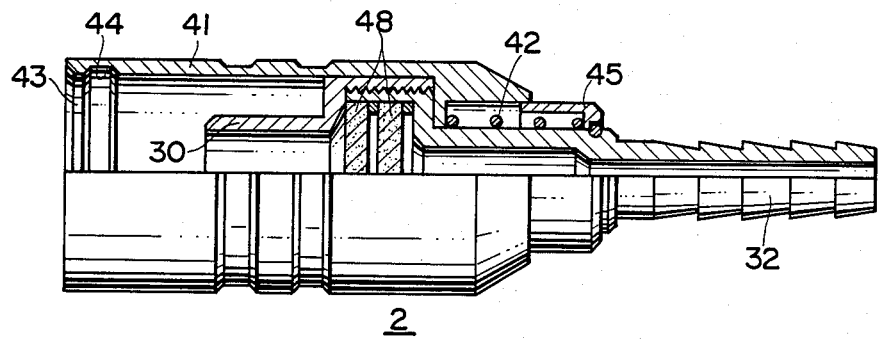
FIG. 2 is a partial longitudinal side view of a plug-side coupling.

When both couplings 1, 2 are separated as shown in FIGS. 1 and 2, the movable valve seat 3 and the movable sleeve 36 are pressed to the forward position by the springs 15, 37, and the valve body 4 is pressed to the forward position by the fluid pressure at the socket-side coupling. The packing 22 of the valve body 4 thereby airtightly contacts with the seat portion 11 of the valve seat 3 to cut off the flow path. And, the outer peripheral face of the valve seat 3 will push out a part of the connecting balls 34 from the outer peripheral face of the socket body 7, and these connecting balls are received by the inner peripheral face 38 of the movable sleeve 36, preventing the escape thereof, and the connecting balls catch a flange 46 of the movable sleeve 36, to hold the sleeve at the forward position thereof. On the plug-side coupling 2, the movable sleeve 41 is pressed by the spring 42 to the forward position.

Figure 3:
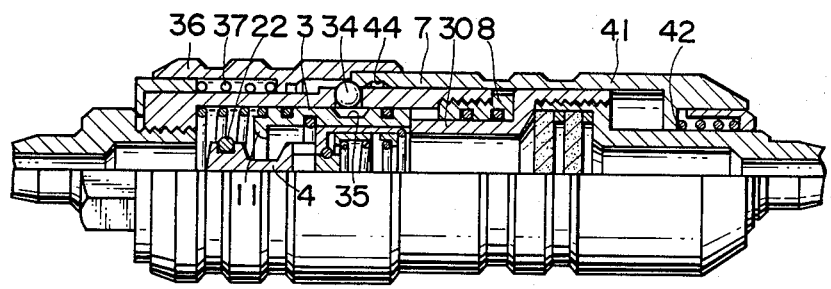
FIG. 3 and FIG. 4 are partial longitudinal side-views, showing the normal connection and separation process between the socket-side coupling and the plug-side coupling when operated by hand according to this invention.

When the plug body 30 is inserted (see FIG. 3) into the socket body 7 and pressed, the movable valve seat 3 and the valve body 4 are pressed to the left or backward position as shown in FIG. 3, and the packing 22 of the valve body 4 is separated from the seat portion 11 of valve body 4 to open the valve, and the annular groove 35 of the valve seat 3 reaches the position of the connecting balls 34.

Figure 4:
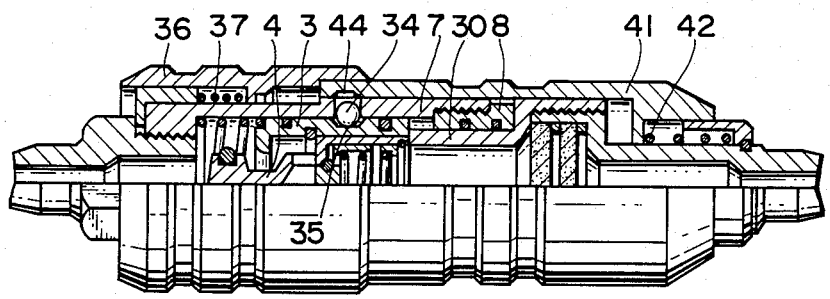

At the same time, the movable sleeve 41 advances, while retreating the movable sleeve 36 against the spring 37 by the force of the spring 42 which is stronger than spring 37, to press the connecting balls 34 into the annular groove 35 of the valve seat 3 (see FIG. 4), and thus the annular connecting groove 44 of the movable sleeve 41 will reach the position of the connecting balls 34 (FIG. 4).

Figure 5:
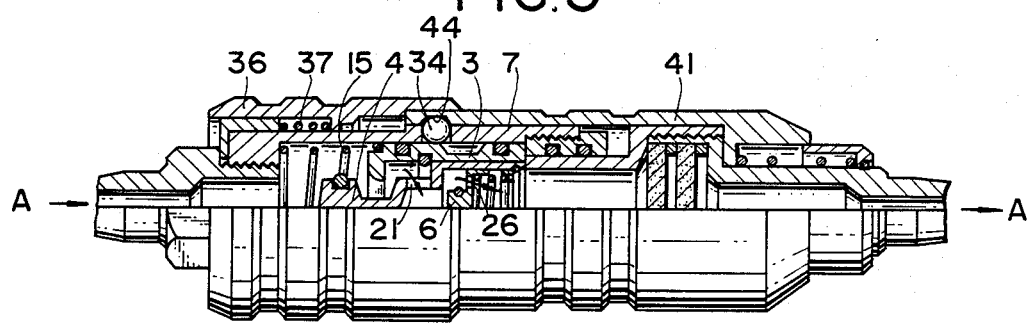
FIG. 5 is a partial longitudinal side view of the connected state between the socket-side coupling and the plug-side coupling.

Thereupon, when the pressing force of the plug body 30 against the socket body 7 is released, as shown in FIG. 5, the plug body 30 moves to the right relative to the movable sleeve 41 as does the socket body 7, by the resilience of the spring 15. The valve seat 3 is advanced in the same direction by the resilience of the spring 15, and the valve body 4 is advanced in the same direction by the fluid pressure, respectively (FIG. 5). As a result, a part of the connecting balls 34 engages with the connecting groove 44 to connect both couplings.

To separate both couplings under normal conditions, the plug body 30 is pressed into the socket body 7, as shown in FIG. 4, so that the annular groove 35 is located opposite the connecting balls 34. Then, the movable sleeve 41 is moved backward relative to socket body 7 by pushing the movable sleeve 36 by hand against the plug body 30, as shown in FIG. 3, and therefore the connecting balls 34 are pressed into the annular groove 35 of the valve seat 3. Thus, the connecting groove 44 of the movable sleeve 41 is separated from the connecting balls and then both couplings 1, 2 will be mutually separated (FIGS. 1 and 2). This separation is easily effected by hand operation and the relative movement between the plug body 30 and the movable sleeve 36.

Under the connected state of couplings 1, 2, (see FIG. 5) the fluid will enter into the socket body 7 as shown by arrow mark A, and pass the check valve 6 through the hole 21 of the valve body 4 to open the check valve; then, through check valve hole 26, the fluid will flow out from the plug body 30 (FIG. 5).

Figure 6:
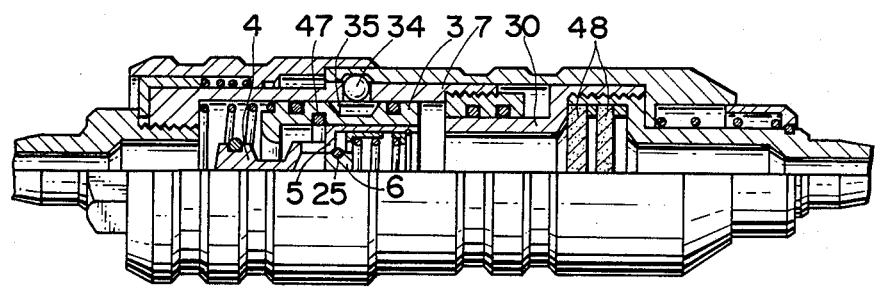
FIG. 6 is a partial longitudinal side view, showing the separation process between the socket-side coupling and the plug-side coupling responsive to counter flow pressure.
Figure 7:
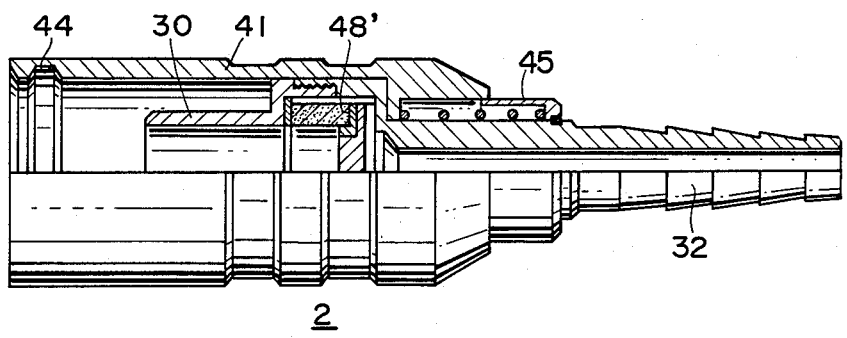
FIG. 7 is a partial longitudinal side view of another embodiment of this invention.

Referring to FIG. 6, when the counter-flow condition is generated, its counter-flow pressure will press the check valve body 6 to make it retreat to the left. Thereupon, the check valve body 6 packing 25 contacts with the valve seat portion 5 of valve body 4 to prevent the counter-flow of fluid, and making the valve seat 3 retreat via the valve body 4 pressing against ring 47. Then, the annular groove 35 of the valve seat 3 is brought opposite the connecting balls 34 (FIG. 6). As a result, the plug body 30 and the socket body 7 are mutually separated by the counter-flow, because the connecting balls 34 are pushed into the annular groove 35 of the valve seat 3. The valve body 4 will then be advanced by the fluid pressure in the normal direction which prevents the continued flow in that same direction as packing 22 seats against seat portion 11.

The plug-side coupling 2 is provided with a back-fire preventing means having the property to pass gas but not to pass flame. As this means, there is provided a disc-shaped member 48 shown in FIG. 2 or alternately a ring-shaped member 48' shown in FIG. 6. The disc-shaped member 48 is provided at right angles to the flow path to enable smooth gas flow. And, the ring-shaped member 48' may change the gas flow in the radial direction, so that it is hardly subjected to the influence of gas pressure. These back-fire preventing means are made of a plurality of piled sheets of wire nettings or of the sintered metal of metallic powder. As a piling method for the wire netting system, those of rough mesh and fine mesh are mutually piled so as to become rough on one side and become fine toward the other side.

According to the safety device for gas welding of this invention, and as in the foregoing description, the check valve body 6 is pressed against the valve body 4 to prevent the counter-flow, and the valve body 4 carries the valve seat 3 to the left or backward to release the connecting means of both couplings 1, 2 by the counter-flow pressure, so that both couplings are separated. Therefore, this safety device provided between the burner torch and the inflammable gas supply source prevents counter-flow and further cuts off completely the flow path from the inflammable gas supply source, in case oxygen gas itself or a mixed gas of oxygen gas and acethylene gas flows backwardly, while burning or not burning, in the direction from the burner torch-side to the inflammable gas supply source, whereby the danger of explosion of the supply source may be eliminated, and the device will thus perfectly function as a safety device.

This invention is not limited to the above embodiments, but may be changed in various ways within the range of the following claims.

What is claimed is:

1. A safety device for gas welding, comprising:
    a socket-side coupling and a plug-side coupling, said socket-side coupling defining an entrance for connection to a gas supply and said plug-side coupling defining an exit for connection to a burner torch; and
    releasable connecting means for separably connecting said couplings to permit the flow of gas in a direction from said socket-side coupling to said plug-side coupling and being responsive to a counter-flow gas pressure acting in the reverse direction from said plug-side coupling to said socket-side coupling for automatically releasing the connection between said couplings to thereby enable said couplings to be automatically physically separated from one another by the action of the counter-flow gas pressure.

2. A safety device for gas welding, comprising:
    a socket-side coupling defining a gas flow path;
    a plug-side coupling separably connected to said socket-side coupling and defining a continuation of said gas flow path;
    connecting means for separably connecting said couplings to one another;
    first valve means for interrupting said gas flow path, said first valve means being incorporated within said socket-side coupling;
    second valve means for interrupting the gas flow path, said second valve means mounted within said first valve means and incorporating check valve means;
    said second valve means, responsive to a counter-flow pressure, cutting off said gas flow path and said first valve means also acting in response to said counter-flow pressure to automatically actuate the connecting means and to thereby release connection of the connecting means resulting in both couplings being automatically separating by mutual separating forces acting on said couplings.

3. The safety device for gas welding according to claim 2, wherein the plug-side coupling is connected to a burner torch, and the socket-side coupling is connected to a gas supply.

4. The safety device for gas welding according to claim 2, wherein the connecting means between the socket-side coupling and the plug-side coupling comprises connecting balls respectively inserted into a plurality of holes provided in the socket-side coupling;
    a peripheral outer face of the movable valve seat pressing each connection ball into connecting position;
    an annular groove provided on the movable valve seat for receiving the connecting balls in a connection release position by engaging with the connecting balls;
    a movable sleeve fitted to the outer periphery of the socket-side coupling and preventing the connection balls from escaping out of the holes of the socket-side coupling when a state of separation between the socket-side coupling and the plug-side coupling exists; and
    a second movable sleeve fitted to the plug-side coupling and having a second connecting groove for engagement with the connecting balls.

5. The safety device for gas welding according to claim 2, wherein the socket-side coupling and the plug-side coupling are mutually physically separated by the counter-flow pressure when the connecting means is released.

6. The safety device for gas welding according to claim 2, further comprising a back-fire preventing means which has the property of passing gas but not passing flame, and which means is incorporated within the plug-side coupling.

7. A safety device for cutting off the flow of welding gas responsive to counter-flow pressure generated from a burner torch-side of a welding apparatus comprising:
   a socket-side coupling comprising a socket body affixed to a gas hose inserting portion;
   a guide sleeve for a plug-side coupling fixedly attached to said socket body;
   a reciprocally movable valve seat slidably mounted within said socket body and having a flange-shaped valve seat portion;
   a reciprocally movable valve body slidably mounted within said movable valve seat and having a packing for sealingly engaging said flange-shaped valve seat portion of said movable valve seat;
   a reciprocally movable check valve body slidably mounted within said movable valve body;
   a compression coil spring urging said movable valve seat toward said guide sleeve;
   an annular groove on said movable valve seat for engagement with connecting balls which hold said movable valve seat in a set position when said connecting balls are engaged in said annular groove;
   a movable sleeve surrounding said socket body; and
   a plug-side coupling for coupling a gas delivery portion thereof to said socket-side coupling, said couplings together comprising said safety device;
   said plug-side coupling comprising a plug body, a reciprocally movable plug sleeve slidably surrounding said plug body, an annular connecting groove on said movable plug sleeve for alternate connection and disconnection with said connecting balls, and a plug compression spring resiliently urging said movable plug sleeve in the direction of connection with said connecting balls and against said movable sleeve surrounding said socket body.

8. The safety device of claim 7 wherein:
   the socket-side coupling is connected to a welding gas supply and the plug-side coupling is connected to a burner torch.

9. The safety device for cutting off the flow of welding gas of claim 7 wherein:
   the socket-side coupling is automatically separated from the plug-side coupling by a compression pressure of counter-flow gas.

10. The safety device for cutting off the flow of welding gas of claim 7 wherein:
    interconnection of the socket-side coupling and the plug-side coupling is released by hand by the mutual compression of a movable sleeve and a plug body.

11. The safety device for cutting off the flow of welding gas of claim 7 wherein:
    the plug-side coupling is provided with a means for preventing back-fire.

12. A safety device for gas welding, comprising:
    a socket-side coupling having a gas flow path;
    a plug-side coupling separably connected to said socket-side coupling and having a gas flow path communicating with the gas flow path of said socket-side coupling;
    a connecting means for separably connecting said couplings;
    a first valve means including a movable valve seat and a movable valve body within said movable valve seat for cutting off the normal flow of gas by sealing contact with said movable valve seat; and
    a second valve means including a second valve seat portion provided on said movable valve body and a movable check valve which seats thereagainst to cut off counter-flow pressure;
    interaction of said second valve means with said first valve means responsive to a counter-flow pressure initiating a control sequence in which said first and second valve means interact with one another to sealingly engage and to cause said couplings to automatically physically separate responsive to separating forces acting on said couplings.

13. The safety device for gas welding according to claim 4, wherein the movable valve seat is urged by a spring in the direction of the plug-side coupling and is held in a position where said peripheral outer face presses said connecting balls outward when said couplings are connected and when said couplings are separated.

14. The safety device for gas welding according to claim 12, further comprising a spring within said check valve having a resilient force which is overcome by a normal gas flow pressure to open said check valve and which closes the check valve responsive to the counter-flow pressure.

* * * * *